March 21, 1967 R. S. SINN ETAL 3,310,782
DATA MESSAGE SYSTEM
Filed Feb. 27, 1963 11 Sheets-Sheet 3

INVENTORS
ROBERT S. SINN &
DENNIS W. HABGOOD
BY Millen and Jacobs
ATTORNEYS

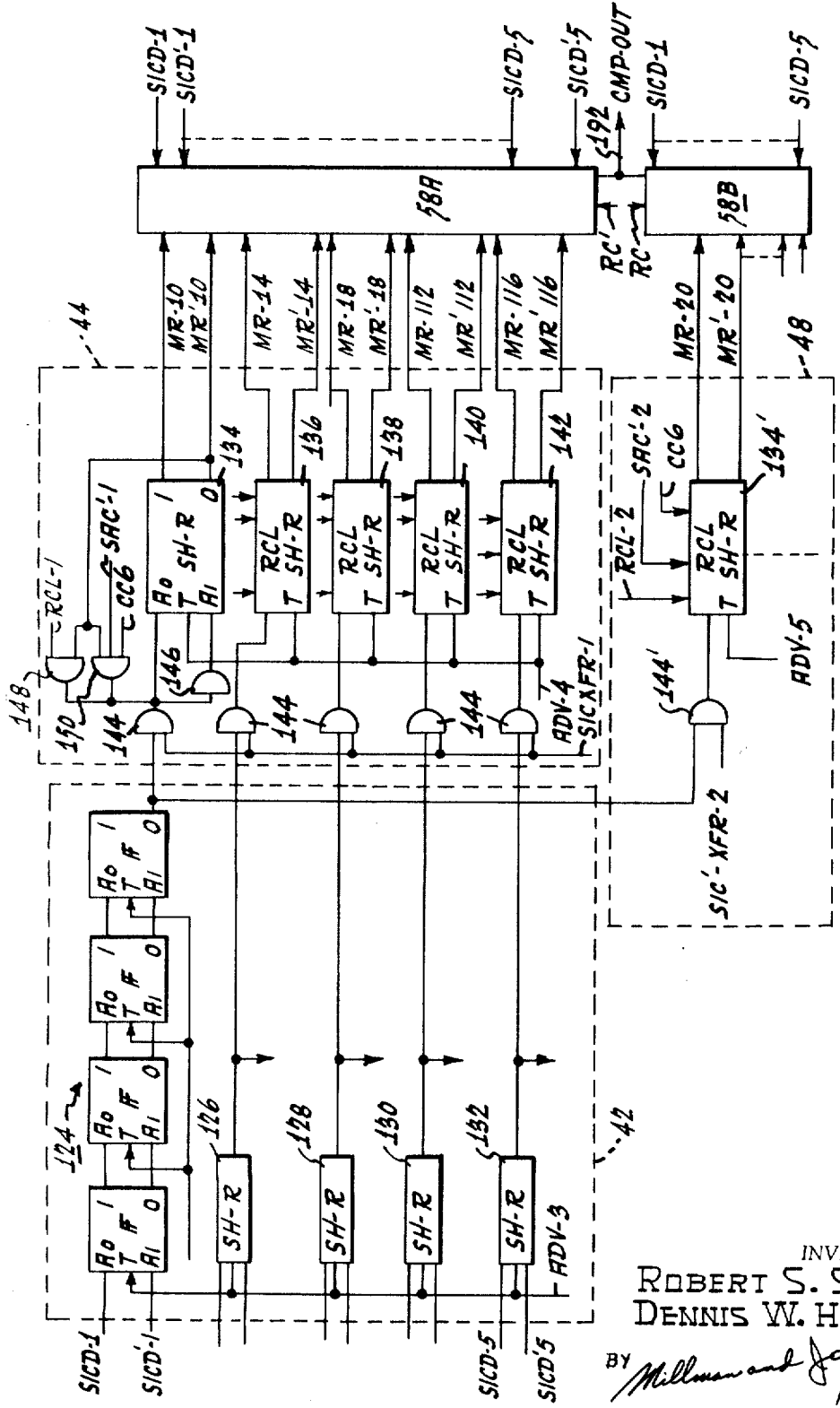

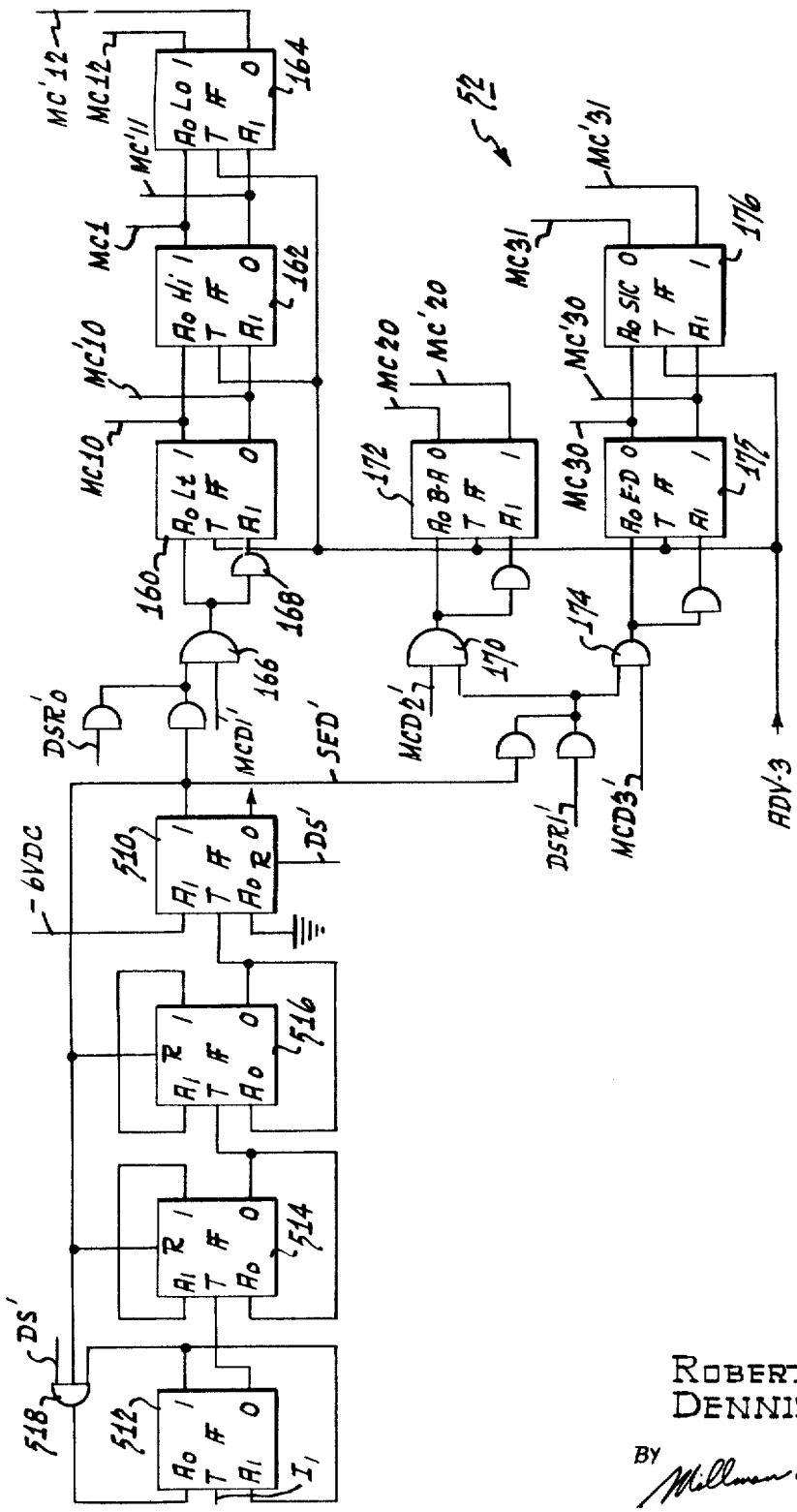

INVENTORS
ROBERT S. SINN &
DENNIS W. HABGOOD
BY Millman and Jacobs
ATTORNEYS

INVENTORS
ROBERT S. SINN &
DENNIS W. HABGOOD
BY Millman and Jacobs
ATTORNEYS

United States Patent Office 3,310,782
Patented Mar. 21, 1967

3,310,782
DATA MESSAGE SYSTEM
Robert Samuel Sinn, Seaside Park, and Dennis W. Habgood, Magnolia, N.J., assignors to Ultronic Systems Corp.
Filed Feb. 27, 1963, Ser. No. 261,530
15 Claims. (Cl. 340—172.5)

This invention relates to a system for storing digital information, and particularly to such a system for automatically assembling messages in accordance with modified information in a master storage for transmission to a plurality of slave storage stations.

This invention is intended for use with a stock quotation system and especially with a master-slave data storage system of the type described in "Information Storage System," Ser. No. 108,120, filed May 5, 1961. In such a system, which is particularly designed for maintaining a storage of updated stock quotation information, a master information storage is provided for maintaining updated information about stock transactions and price quotations. The master storage supplies digital messages to a plurality of slave storage systems to maintain the slave stores in updated condition. Access to each of the slave storage systems is provided for a plurality of individual request units which may be maintained on a broker's desk. Thereby, a nationwide network of communication from the master to the slave stations is afforded in order that slave stations at each of the major cities or sections of the country have updated stock quotation information. The individual brokers in the different sections of the country can gain access to the associated slave station without requiring long distance communication from the requesting broker cross-country to the master store.

It is among the objects of this invention to provide a new and improved system for storing and supplying information about stock transactions and quotations.

It is an object to provide a new and improved automatic data message assembly and transmission system.

An object is to provide a new and improved data storage system having a master store and a plurality of slave stores together with an automatic system for updating the slaves in accordance with changes in the information stored by the master store.

In accordance with an embodiment of this invention which is directed to a stock transaction system, the master and slave stores are in the form of continuously rotating magnetic drums in which stock transaction information such as High, Low, and Last prices and other categories of information are stored around the drum and therealong in accordance with stock-identifying codes. The master store also includes, in connection with each stock identifier, a storage section for marker signals that designate updated categories of information. A master output system is provided that includes a message assembler and means for detecting the marker signals on the drum. When such a marker signal is detected, a message is assembled automatically in accordance with the updated information and transmitted simultaneously to the slave stations where the message is used automatically to update the slave drum.

The foregoing and other objects of this invention, the various features thereof as well as the invention itself, may be more fully understood from the following description when read together with the accompanying drawing, in which:

FIG. 4 is a schematic block and logic diagram of a delay register and portions of the message register used in the system of FIG. 1;

FIG. 5 is a schematic block and logic diagram of a message register used in the system of FIG. 1;

In the drawing, corresponding parts are referenced by the same numerals throughout.

Figure 1:
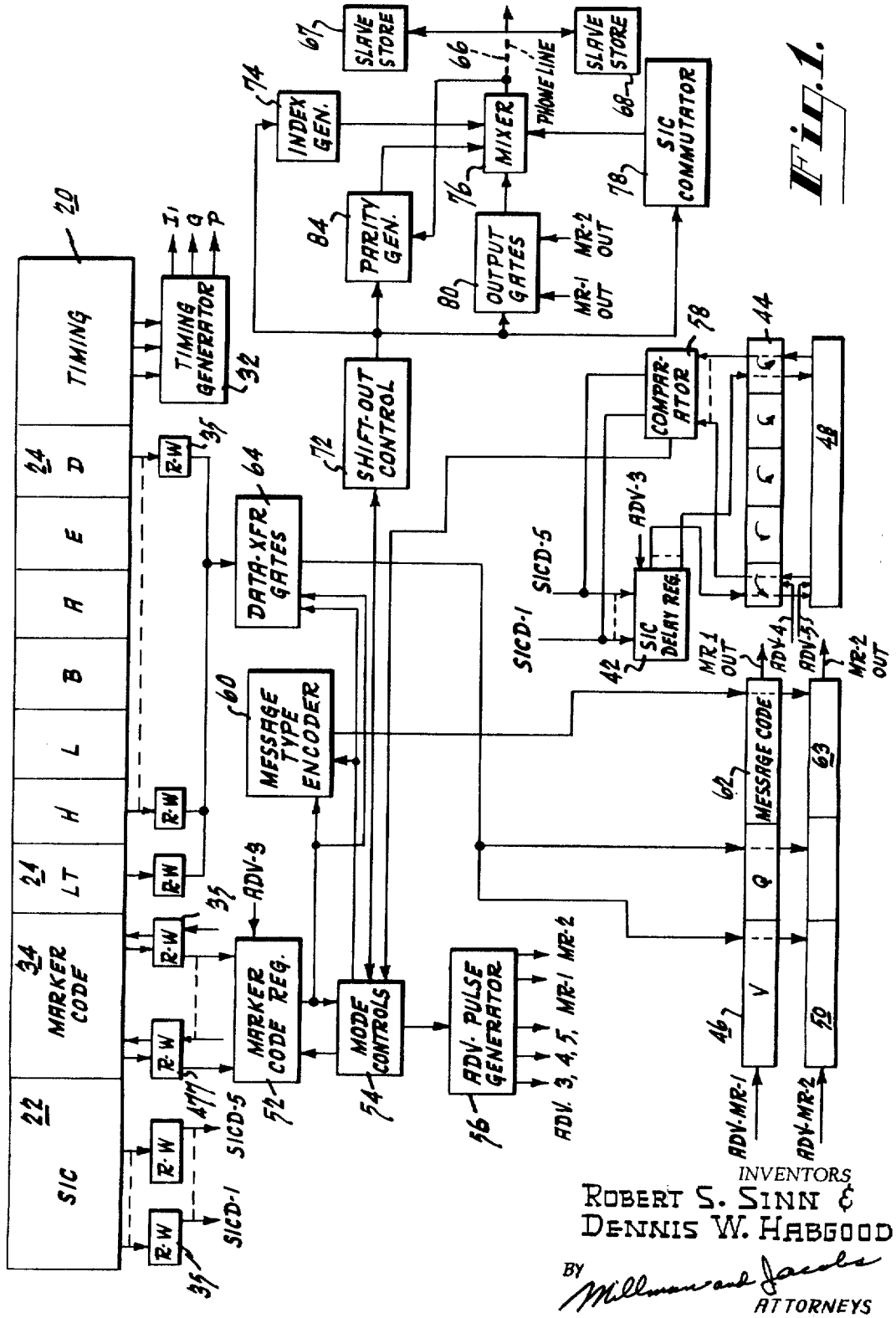
FIG. 1 is a schematic block diagram of a storage and message assembler system embodying this invention.
Figures 12, 13:
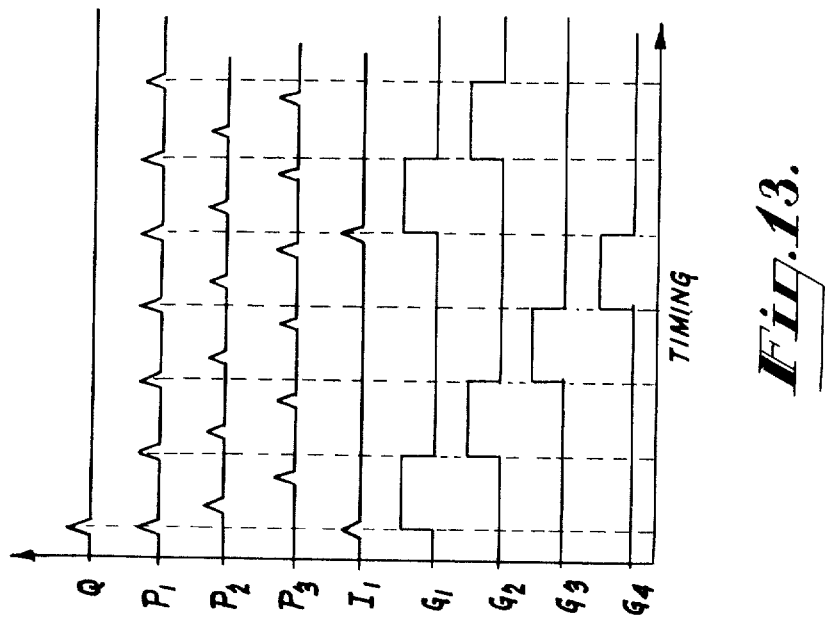
FIG. 12 is a schematic diagram of the format of signal storage on the drum in the system of FIG. 1.
FIG. 13 is an idealized graph of the time relationship of certain control signals used in the system of FIG. 1.

In the system of FIG. 1, a continuously rotating magnet drum 20 is used as the master cyclic store. The format of drum 20 is illustrated in FIG. 12; it contains a group 22 of five SIC tracks which are broken up into cells, each made up of four bit positions around the drum. Thereby, a cell stores the twenty bits making up four coded alphabetic characters identifying each stock. Associated wtih each SIC cell are a plurality of bins 24, each of which is used to store one of various categories of related stock information such as Last, High, Low, Close, Bid, and Ask prices, Volume, Earnings, and Dividends. Three tracks in the four bit positions of a cell in each bin provide storage for twelve bits of three nurmeric characters in binary coded decimal form. The cells storing the categories of inforation associated with each stock-identifier code are offset by a full cell rotation with respect to its associated code as shown in FIG. 12. Thus, as the drum rotates in the direction of arrow 25, first the SIC code cell is read, and thereafter, the associated cells of stock information.

Three timing tracks are formed around the drum. One timing track 26 contains a pulse at the beginning of each bit position around the drum; an index track 28 contains a pulse at the beginning of each cell position around the drum; and another track 30 contains a pulse at the beginning of each quadrant position. A timing generator 32 is used to receive the signals from each of the tracks to generate a series of cyclic timing signals I, P, and G, as shown in FIG. 13.

Another bin 34 of the drum has three tracks for storing marker signals; the bin 34 has a plurality of cells each associated with one SIC cell and which is offset in the same manner as the information bins. A marker signal pulse is stored in one of the cell positions when one or more of the categories of information associated with a particular stock is updated; the marker pulse indicates that a message should be assembled to update the slave storage stations to conform to the master. As shown in FIG. 12, six positions in each marker bin cell are so utilized to indicate updating of Low, High, and Last prices, Bid and Ask prices, Earnings and Dividends, and of the SIC code itself.

The message assembler system and controls operate to assemble updating messages to all the slave station in accordance with the marker signals, and to transmit them to the slave stations where they are used to update automatically the slave storage drums in the manner described in the above-cited patent application. The present system operates in accordance with a four mode cycle. The modes include a drum search operation, a comparison operation, a drum transfer operation, and a final message shift-out operation.

In the initial Drum Search Mode, the SIC signals are continuously read from the SIC tracks 22 of the drum 20 by means of read-write heads and amplifiers and passed through five 4-stage shift registers 42 (FIG. 1), with one shift register for each SIC track, and thence to five other shift registers 44, one associated with each SIC track. The four-bit delay of registers 42 corresponds to the cell offset between the SIC and information bins in the drum format. The five shift registers 44 are each of the recirculating type and have a four-bit capacity to provide a twenty-bit store corresponding to an SIC code. The shift registers 44 form a part of a Message Assembly Register 46 which is also represented as MR–1. A second such register, MR–2, is provided of similar construction. The outputs of the delay register 42 also are supplied to the five recirculating shift registers 48 of the second message register 50. MR–1 and MR–2 are the same in construction and operation except that generally, one is operated to send out an assembled message while the other is assembling the next message.

At the same time that any particular cell of SIC signals is being read from the delay register 42 into the registers 44, the marker signals in the tracks 40 are being read to a marker code register 52. Due to the delay of registers 42, which delay corresponds to the cell time of the offset between the SIC bin 22 and marker bin 34 on the drum 20, the SIC code cell established in the registers 44 corresponds at any instant to the associated marker code cell established in the register 52. The marker signals established in the registers 52 are regularly monitored for detection in a Mode Control 54, and when a marker is detected, the drum search mode is terminated. The termination is by way of a control of an advance pulse generator 56 which generates advance–3 pulses to step the delay registers 42 during the search operation and advance–4 and –5 pulses to step the registers 44 and 48 at that time.

When a marker has been detected, the drum search mode is terminated, and a Comparison Mode is started. The control section 54 changes the registers 44 to recirculation registers, and they continuously recirculate and supply corresponding signals synchronously to a comparator 58. The comparator also receives the SIC signals from the drum tracks directly and continuously compares corresponding signals from the drum with the signals being supplied by the recirculation registers 44. The comparator, in effect, locates that portion of the drum corresponding to the marker signal established in the registers 52 by searching for the particular SIC code registered in recirculation registers 44. When this SIC is again located, the comparator generates a signal that is supplied to the controls 54 to step the operation to the next mode, the Drum Transfer Mode.

While the comparison operation is going on, a message-type encoder 60 receives the marker signal from the register 52 and establishes a message-type code corresponding to that marker signal. This message-type code is then ready for entry into a message code section 62 and 63 of MR–1 and MR–2, and is so transferred during the drum transfer mode.

The marker code signals from the register 52 are also supplied to a set of drum transfer gates 64 which receive the information signals from all of the tracks in the information bins (as well as the SIC bin, where called for). Depending upon the marker signal, which determines the different categories of information to be transmitted in the updating message, the associated cell or cells of information signals are established in the message register 46 or 50. Two sections of the message register, the Q-section and V-section are each able to hold twelve bits of information so that two of the information categories may be transferred in any single message. Alternatively, new SIC codes may be transferred, one for each message. The V- and Q-sections of the message register 46 are each divided as three 4-bit shift registers which respectively receive signals corresponding to one of the three tracks of a category. These shift registers may be connected in series as described below for formation of the final message to be sent out.

When the comparison mode is completed, as described above, the controls 54 change to the drum-transfer mode in which the proper information signals are actually transferred through the drum-transfer gates 64 to the V- and Q-sections of the register 46 (or 50). At the same time, the encoder 60 supplies the message code to the appropriate section of the message register. With this transfer, the essential content of an updating message is established in the message register; namely, the SIC or stock identifier code, the message-type code identifying the categories of updated information, and the information itself.

Upon completion of the drum-transfer mode, the controls 54 are changed to the Shift-Out Mode for assembly of the complete message and its transmission on the line 66, or the like, to the slave stations 67 and 68. For this purpose, clock pulses are generated at a 1-kilocycle (or any other appropriate) rate, which is the rate of transmission of a suitable telephone line 66 from the master station to the slave stations 67, 68. A clock pulse generator and counter 72 provides control signals over a cycle of 64 clock pulses corresponding to a 64-bit message cycle.

The first ten counts of the counter 72 controls an index generator 74 which supplies a series of nine 1-bits to a mixer 76. This series of 1-bits is followed by a 0-bit in the tenth position to form an indexing train that is distinct from any train of information or code signals that would normally be transmitted, and which indexes the start of a message in a unique fashion. Thereafter, during the counts of 11 to 30 in counter 72, an SIC commutator 78 supplies the SIC signals from the recirculation registers 44 (or 48, if MR–2 is then shifting out) in proper order to the mixer 76. Thereafter, during the counts of 31 to 37, and 38 to 61, the seven bits from the message code section 62 or 63 and the twenty-four bits from the V- and Q-sections of MR–1 or –2 are serially transmitted as a string through a gate 80. The last two bits of the 63-bit message are supplied by a parity generator 84 which counts the odd and even bits of the portion of the message following the indexing portion and supplies a bit to provide proper parity of the even bits of this section of the message in the sixty-second count and a bit to complete the parity of the odd bits during the sixty-third count.

In this way, the mixer 76 passes to the dataphone communications line 66 a fully assembled 63-bit message. The message is preceded by a 10-bit indexing portion, followed by a 20-bit portion containing the SIC signals, a 7-bit portion containing the message code identifying the type of information signals that are being sent, a 24-bit section corresponding to the information signals themselves, and a 2-bit parity section.

This 63-bit message is transmitted over the dataphone to each of the slave stations where it is received and processed to update the slave drum in a manner similar to that described in the aforementioned patent application.

The information bins 24 may be updated as required in any suitable fashion, for example, by a manual input, or automatically from the output of a data processor that would receive its inputs from the well known ticker-tape line, or any other appropriate source. A marker signal is written into the associated one of the bit positions of a marker cell 34 whenever information is written into any one of the bins 24 of that same cell. The write signals that are individually associated with the bins 22 and 24 are used to direct a 1-bit signal to the proper location in the marker cell via the write section of the read-write amplifiers 35. As a message is being assembled in accordance with a marker signal, that marker signal is "erased" from the marker cell when the data in the message is transferred into the message register 46 or 50; this marker erasure takes place during the data transfer mode. The erasure is also by way of the write-section of the read-write amplifiers 35, and a 0-bit is written in place of the 1-bit marker.

Where several categories of information for a particular SIC or cell are updated, a marker bit for each category is established in the associated marker cell. These marker bits are given a priority in determining which category of information is to be used for a first updating message, which for a second updating message, and so on.

In overall operation, one of the message registers, say MR–1, is loaded with a message while the other MR–2 is transmitting its assembled message out onto the dataphone line 66. After MR–1 has its message fully assembled, and the line 66 is free, then MR–1 goes into the shift-out mode, and MR–2 is ready for the assembly of a new message, and it is effectively in the drum search mode. Whenever the drum search mode is initiated, the drum marker bin is scanned for a marker bit to initiate the assembly of the next message. In this way, a substantially continuous flow of updating messages out on the dataphone line 66 is achieved, and the slave station stores are maintained in updated condition.

The detailed logic of the system of FIG. 1 is illustrated in FIGS. 2 to 11. This logic is illustrated as NOR logic. Suitable circuits for the various gates, flip-flops, shift registers, counters, etc., are well known in the art, and are disclosed in the copending patent application, Ser. No. 149,913, filed Nov. 3, 1961. The memory 20 may be any suitable form of magnetic drum that can be read and written on in the manner described, and with any of the various known recording techniques. Other types of cyclic memories may also be used, such as a recirculating delay line.

Figure 2:
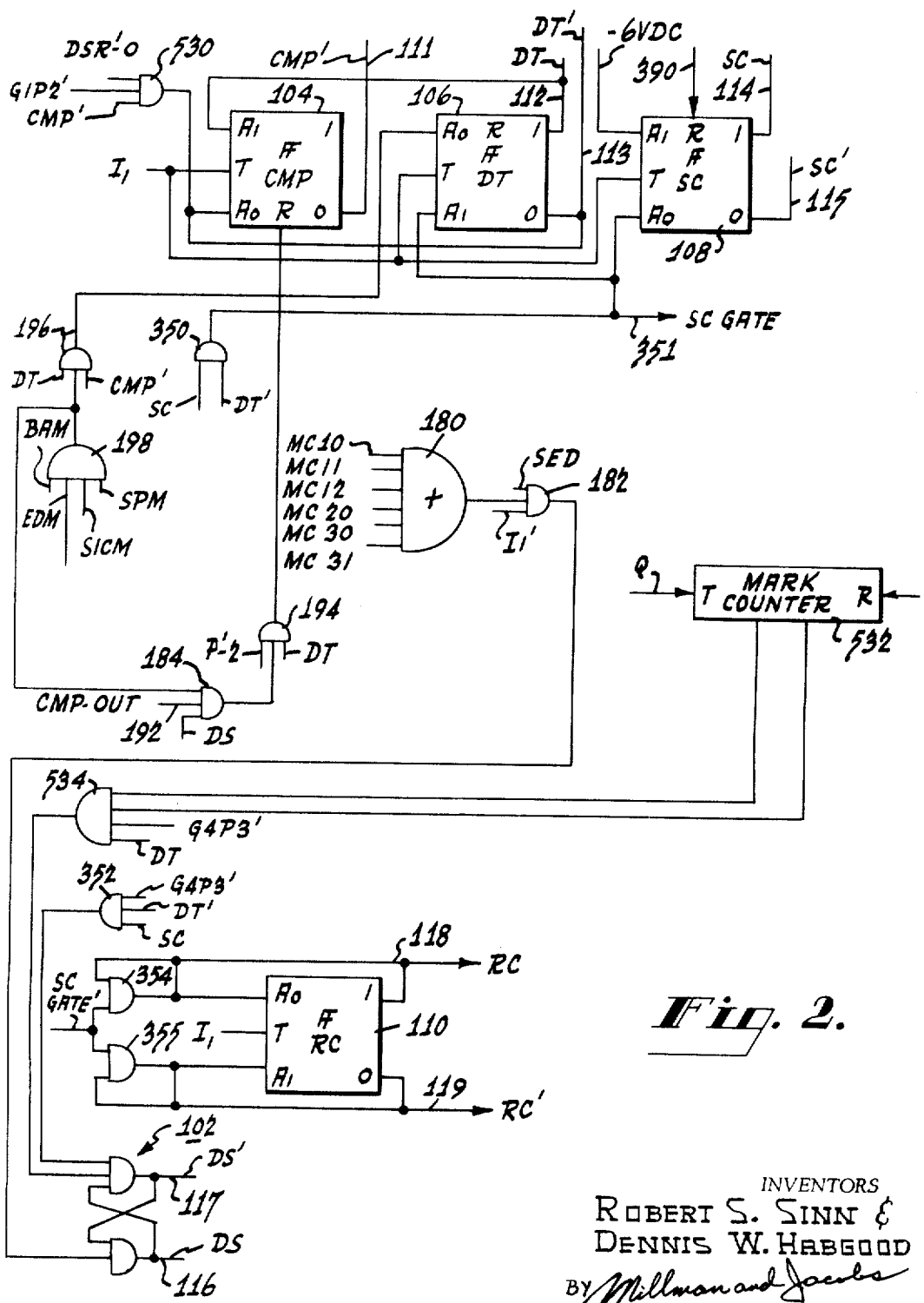
FIG. 2 is a schematic block and logic diagram of a mode control used in the system of FIG. 1.

In FIG. 2 the logic of the mode control 54 is shown. The four modes of operation are controlled by four flip-flops 102, 104, 106, and 108; the drum-search FF–102 is shown as two NOR gates, cross-coupled in regenerative fashion; the others shown as FF blocks have, in addition, a steering circuit for a positive trigger pulse (T) which is controlled by the A–1 and A–0 inputs for setting and resetting the flip-flop. The 1- and 0-output signals of the flip-flop are the inverse of the respective 1- and 0-input signals. The binary signals are high and low voltage levels (e.g. ground and −6 v. D.-C.), and the NOR gates are enabled by the low voltage levels. A NOR gate with a single input is used as an inverter, and any inverted signal is obtained in that manner, even though not illustrated in the drawing. Inverted signals are represented by the addition of a prime ('). Combined timing signals are obtained where required by gating the individual signals together in gates that are not shown for simplicity of illustration. Where required, the gate inverters are connected in parallel (though not shown) to provide ample drive for large loads.

The mode of operation of MR–1 and MR–2 is controlled by the register-control FF–110. In the drum-search mode, the drum-search FF–102 is in the set or 1-state; FF–104, –106, –108 are all reset; and RC FF–110 is either set or reset depending upon which of the message registers is to assemble the next message; FF–108 can also be set under conditions explained below.

Figure 3:
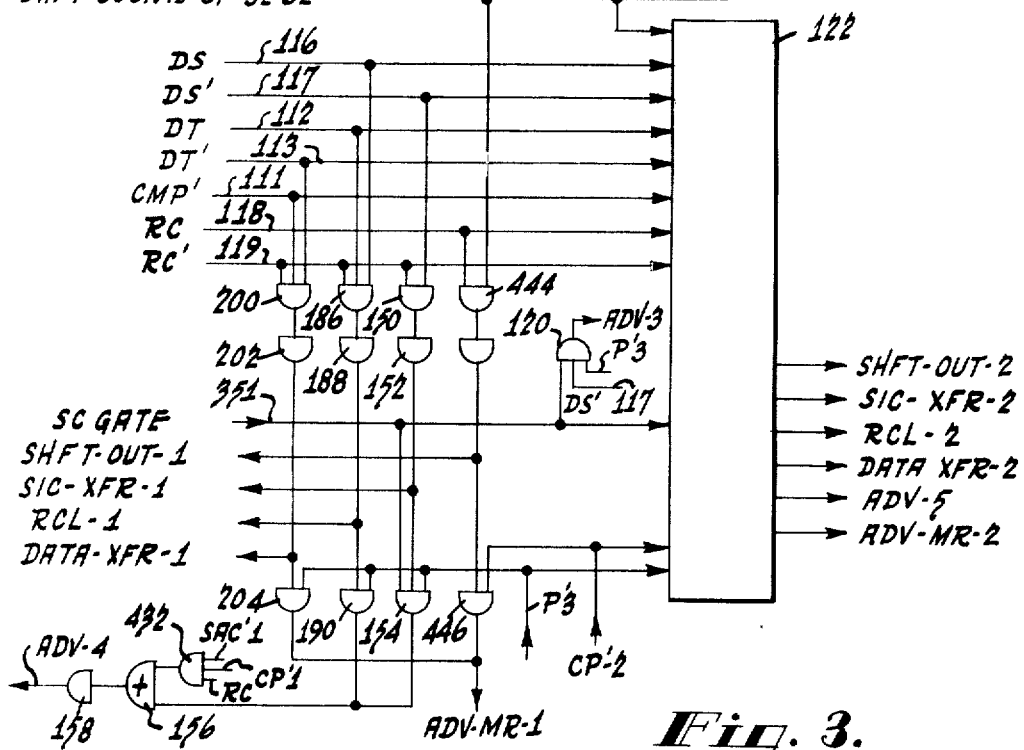
FIG. 3 is a schematic block and logic diagram of an advance pulse generator used in the system of FIG. 1.

The output terminals 111 to 119 of these control flip-flops are connected as inputs to the advance pulse generator 56, the logic of which is shown in FIG. 3. The ADV–3 signal pulse is generated by a gate 120 which receives as its input signals the DS', P'–3, and the SC–gate signals; the generation of the latter is described hereinafter.

FIG. 3 also illustrates the details of the logic for generating ADV–4 and ADV MR–1 and various other control signals used for the MR–1 register. A similar set of gates represented by block 122 in FIG. 3 is used for generating the corresponding advance signals, ADV–5 and ADV MR–2, for MR–2. These gates 122 are the same as those shown in detail for MR–1 except that RC' and RC are reversed in gates 122 from the corresponding gates illustrated for MR–1 in FIG. 3. The ADV–3, –4, and –5 are respectively applied to the SIC delay register 42, the SIC section 44 of the MR–1, and section 48 of MR–2, as shown in FIG. 4.

The delay register 42 (FIG. 4) includes five 4-stage shift registers 124, 126, 128, 130, and 132, each of which is made up of four cascaded flip-flops (with the 1- and 0-outputs of one being connected respectively to the 0- and 1-inputs of the next), all triggered by the ADV–3 pulses, as shown for the first register 124. All of the shift registers are similarly constructed, unless otherwise indicated. The 0- and 1-inputs of the first stage of register 124 receives the SICD–1 (and the inverted form thereof) from the drum read-write amplifier for the first SIC track on the drum 20. The other registers 126 to 132 receive the corresponding signals from the read-write amplifiers of the second to fifth tracks of the SIC section of the drum 20.

The SIC section 44 of MR–1 also includes five 4-stage shift registers 134 to 142, which are similarly constructed. The 0-output of the last stage of register 124 is passed via a gate 144, enabled by the signal SIC XFR–1, and supplied directly and via an inverter 146 to the two inputs of the first stage of register 134. The 0-output of the last stage of register 134 is recirculated via either one of two gates 148 and 150 back to the input of the register 134. Gate 148 is enabled by signal RCL–1 from the advance pulse generator (FIG. 3); and gate 150 is enabled by SAC'–1 and CC6 which are otherwise generated. The other registers 136 to 142 are similarly constructed as recirculation registers in the same manner and operate under the same control signals. The outputs of shift register 134 are the message register output signals MR–10 and MR'–10. The outputs of the other registers 136 to 142 are correspondingly identified in FIG. 4.

The SIC section 48 of MR–2 is similarly constructed with five recirculation shift registers that are represented by the first such stage 134'. The latter is constructed in the same fashion as register 134, except that it receives the ADV–5 advance signal and recirculation control signals RCL–2, or SAC'–2 and CC6; the passage of the signals from the corresponding first register 124 of delay register 42 is via gate 144' receiving the control signal SIC XFR–2. The construction of the other registers of the SIC section 48 and their connection to delay register 42 will be apparent from the above description.

The control signal SIC XFR–1 for enabling the gates 144 in MR–1 section 44 is generated in the advance pulse generator, FIG. 3, via gate 150 and inverter 152. Gate 150 receives the DS' and RC' signals which indicate that the system is operating in the drum-search mode, and MR–1 is to be loaded with a new message. The output of inverter 152 is also supplied to gate 154 together with the SC–gate signal and the P'–3 signals to generate, via OR gate 156 and inverter 158, the ADV–4 signals. As shown in FIGS. 12 and 13, the P'–3 signals (the inverted form of P–3) are generated during each bit time as the drum 20 rotates. Thereby, the ADV–3 and –4 signals are both generated by P'–3 and synchronously therewith during the drum-search mode as the drum rotates. The ADV–3 signals successively step the SICD signals from the drum into the individual shift registers 124 to 132 of the delay register 42, and thence ADV–4 steps them into the shift registers 134 to 142 of MR–1. Thus, stock code signals which are continuously being read from the drum enter the delay register 42 during the P–3 time and are synchronously shifted into the SIC section 44 of MR-1. The SIC shift registers 44 are effectively a continuation of the shift registers of delay register 42 at this time since the ADV-4 pulses are being generated concurrently with ADV-3.

In FIG. 5 the details of the logic for the marker code register 52 are shown. A 3-stage shift register is made up of cascaded flip-flops 160, 162, and 164 which are used to store the marker pulses corresponding to Last, High, and Low, respectively. The first FF-160 receives signals from the read-write amplifier 35 supplying the MCD'-1 signals from the first track of the marker code bin 34 via gate 166 (except if a DSR-0 or SED signal is present, as discussed below) and inverter 168. A gate 170 passes the second track marker pulses MCD'-2 (except if DSR-1 or SED is present) to the inputs of FF-172, which stores the marker signal for Bid and Ask messages. Gate 174 passes the third track marker signals MCD'-3 to the input of the first flip-flop 175 of a 2-stage shift register that includes FF-176. FF-175 and -176, respectively, store the marker code signals for messages relating to earnings or dividends, and to SIC code changes. All of the flip-flops of marker code register 52 are stepped by the ADV-3 signals.

For detection of the marker code signals, the 1-output of each of the flip-flops in register 52 is applied as an input to OR gate 180, FIG. 2, the output of which is applied to a gate 182 which also receives the I'-1 signal (FIG. 13) at the beginning of each cell, and is inhibited by SED, when present. Thus, effectively, gate 182 detects whether a marker pulse has been established in any of the flip-flops in register 52 after a marker code cell has been read into that register 52. If such a marker code pulse is established, the output gate 182 is a high signal that resets drum-search FF-102 to end the drum-search mode of operation.

Thus, during the drum-search mode, each cell of marker codes is established in the register 52 and examined via OR gate 180 and gate 182 to determine whether or not the code pulse indicates that a message should be assembled. Each time a cell of marker codes is established in register 52, the associated, offset SIC cell is established in the SIC section 44 of MR-1 (or section 48 of MR-2, as the case may be). The delay register 42 serves to place the marker code and SIC signals in the same phase at registers 52 and register sections 44 or 48. When DS FF-102 is reset to terminate the drum-search mode, the DS' signal becomes high to close gate 120 (FIG. 3) and terminate the generation of ADV-3 signals. Thereby, the marker code signals remain established in register 52 without further change until the next drum-search mode is initiated and the ADV-3 signals are again generated. Likewise, there is no stepping of delay register 42. The generation of ADV-4 signals and SIC XFR-1 signals via gate 150 is also terminated so that the registers 134 to 142 in section 44 (FIG. 4) are effectively disconnected from the register 42.

The comparison mode is initiated as soon as the drum search FF is reset. At that time, its DS-output is low and is effective to enable a gate 184 (FIG. 2) that receives the signals from the output of the comparator 58. As shown in FIG. 4, the comparator is formed in two sections 58A and 58B which are substantially identical except that comparator 58A receives the signals from SIC section 44 of MR-1 together with the RC' signal, and comparator 58B receives the signals from MR-2 section 48 together with the RC signal. The SICD signals from the drum read-write amplifiers are supplied to both comparators 58A and 58B. The outputs of the comparator sections are connected together to provide the CMP-Out signal supplied to gate 184 (FIG. 2). For purposes of the comparison operation, the registers 134 to 142 are operated as recirculation registers via gate 148 with the recirculation control signal RCL-1 being generated via gate 186 (FIG. 3) and inverter 188 (since DS and DT are both low from their respective reset flip-flops). At the same time, successive ADV-4 signals are generated via gate 190 at each P'-3 signal.

Thus, in FIG. 4, when MR-1 is being loaded, RC' enables comparator 58A, and recirculation shift registers 134 to 142 successively supply the five tracks of SIC signals via their output lines to the comparator 58A. At the same time the five tracks of SICD signals from the drum are synchronously supplied to the comparator section 58A. A suitable form of comparator logic that may be employed is that operating on the logic relation: $ab'$ or $a'b$. Thus, comparator 58A may include five pairs of gates, each enabled by RC', and each pair used to compare the signals in one of the five SIC tracks in accordance with the above relation. Thus, the outputs of these five gates, connected to CMP-Out, generate a low signal at the input to gate 184 only when there is a true comparison for the five pairs of bits being compared at any instant.

Thus, whenever there is a non-comparison in the comparator 58A, the signal on CMP-Out is high so that the output of gate 184 (FIG. 2) is low to enable gate 194, together with the DT signal from reset DT FF-106. Thereby, gate 194 passes the P-2 pulse (associated with the drum bit being compared) to reset CMP FF-104. The latter FF-104 is set to the opposite state at the beginning of each cell by the I-1 trigger pulse with the 1- and 0-outputs of the DT FF-106 priming the corresponding inputs of FF-104. With CMP FF-104 being set at the beginning of each cell time by 1-1, if a non-comparison exists for any of the four sets of SIC bits in a cell, a high signal will be supplied via CMP-Out at least once, which is effective via gate 194 to reset CMP FF-104 at least once during that cell time. Accordingly, at the beginning of the next cell, CMP FF-104 is again set, and the operation is repeated.

However, if a true SIC comparison is found during one cell, CMP FF-104 is not reset at the next I-1 time. Under these conditions, the DT FF-106 is set by that I-1 due to the set-priming output of gate 196 which receives a low CMP' signal (representing a set FF-104) together with a low DT signal (representing the previous reset condition of FF-106) as well as a low signal from OR gate 198 (which condition is produced by the existence of a marker code pulse).

With the detection of a true comparison, and the setting of DT FF-106, the DT signal goes high to close gate 194 and terminate the comparison operation. Thus, at the termination of the comparison mode, the CMP FF-104 and DT FF-106 are both set. In the advance pulse generator (FIG. 3) the high DT signal to gate 186 terminates the generation of ADV-4 pulses as well as the recirculation control signal RCL-1, so that the shift registers 134 to 142 (FIG. 4) are no longer permitted to recirculate via gates 148.

The drum-transfer mode is initiated by the above described setting of DT FF-106, and this mode continues as long as CMP FF-104 and DT FF-106 continue in the set condition. With both CMP' and DT' being low, gate 200 in the advance pulse generator (FIG. 3) is enabled to generate the Data-XFR signal, via inverter 202, and the ADV-MR-1 pulses, via gate 204, with successive P'-3 signals. This condition continues for one full cell time, during which the required information in the associated offset bins should be transferred into the message register. At the next I-1 signal, with the data transferred and the message assembled, the CMP FF-104 is reset due to the DT signals that are supplied to its inputs.

Figure 6:
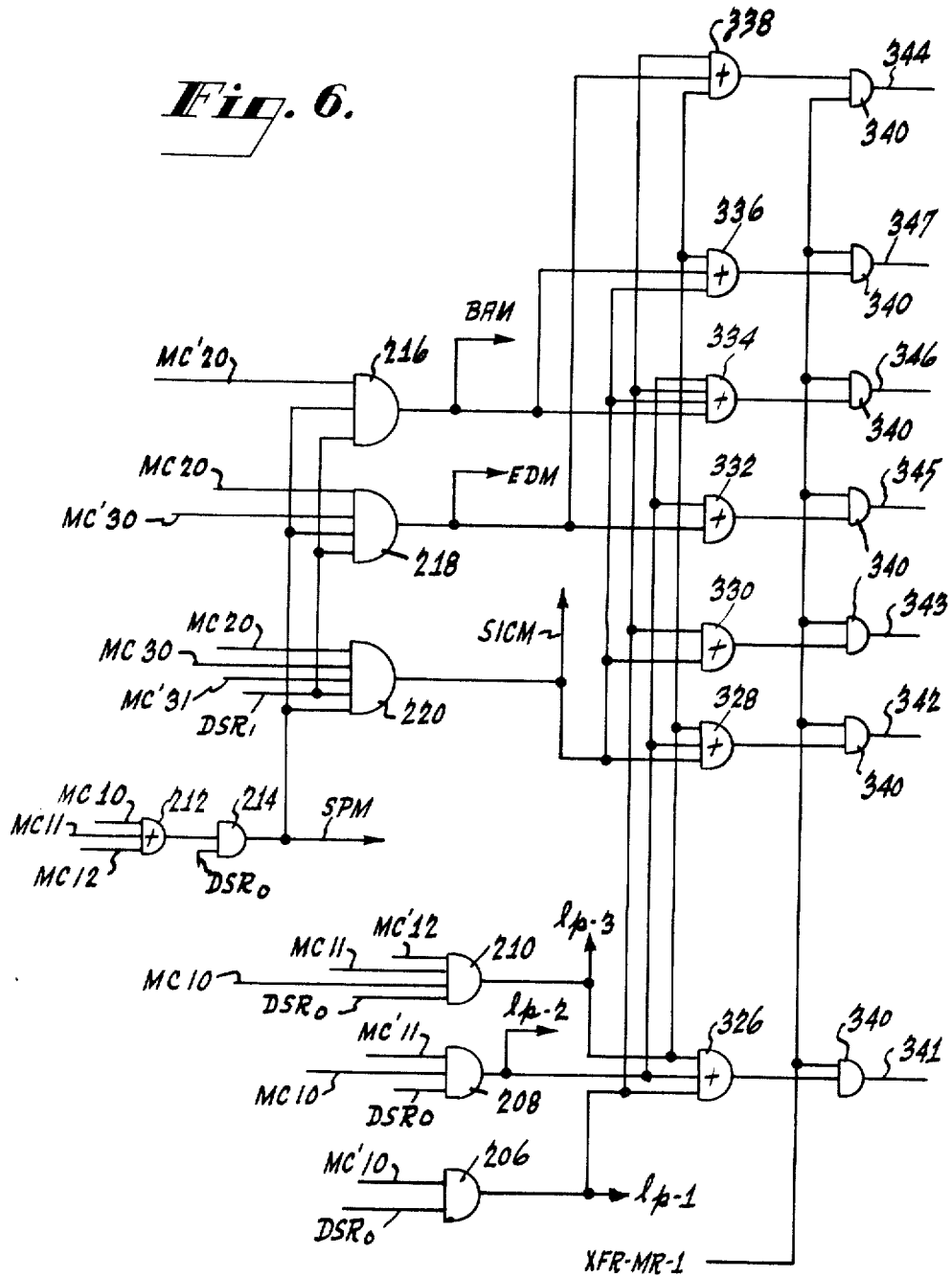
FIG. 6 is a schematic block and logic diagram of a message-type encoder used in the system of FIG. 1.

The drum-transfer operation is based on certain message-type control signals that are generated in the message type encoder, the details of which are shown in FIG. 6. A gate 206 passes the marker bit from FF-160 (FIG. 5) for Last (in the absence of the DSR-0 control signal) to generated $1p$-1. Gate 208 generates $1p$-2 when it receives the High bit from FF-162 in the absence of the Last bit from FF-160; and gate 210 generates $1p$-3 when it receives the Low bit from FF-164 in the absence of both the Last and High bits from the message code register 52 (DSR-0 would inhibit the generation of all of these signals).

Thus, these three gates 206, 208, 210 establish the priority of the type of message to be transmitted, when more than one of the price marker bits are established in the message code register 52, that is, when updated messages for more than one type of price information have to be provided. This priority is established since a fixed format type of updating message is utilized, and the amount of updating information that may be transmitted in any one message is limited. Thus, if a new Last price is established which is also a new High price, the priority gate 206 insures that a Last price message is transmitted, and subsequently, the new High price may be transmitted (an alternative system of operation is described below). This set of priorities may be rearranged to suit any desired requirements or changes in preference of the brokers. With the priorities that are illustrated, a broker is always sure of receiving updated Last prices with a minimum of delay.

The price marker bits from the message code register FF-160, -162, and -164 are supplied to an OR gate 212, the output of which is passed by a gate 214, in the absence of a DSR-0 signal, to generate a select-price message signal, SPM. The SPM signal is supplied as an inhibit signal to three other gates 216, 218, 220, which gates determine second order priorities of messages to be transmitted. The gate 216 receives the Bid and Ask bit from FF-172 to generate a control signal BAM indicating a Bid and Ask message. The gate 218 generates an EDM signal for an Earnings or Dividend message when it receives the Earnings and Dividends bit from FF-174, but not the Bid and Ask signal nor the SPM signal. Finally, gate 220 generates the SICM signal, which is lowest in priority, when only the SIC bit is applied from FF-176.

Figure 7:
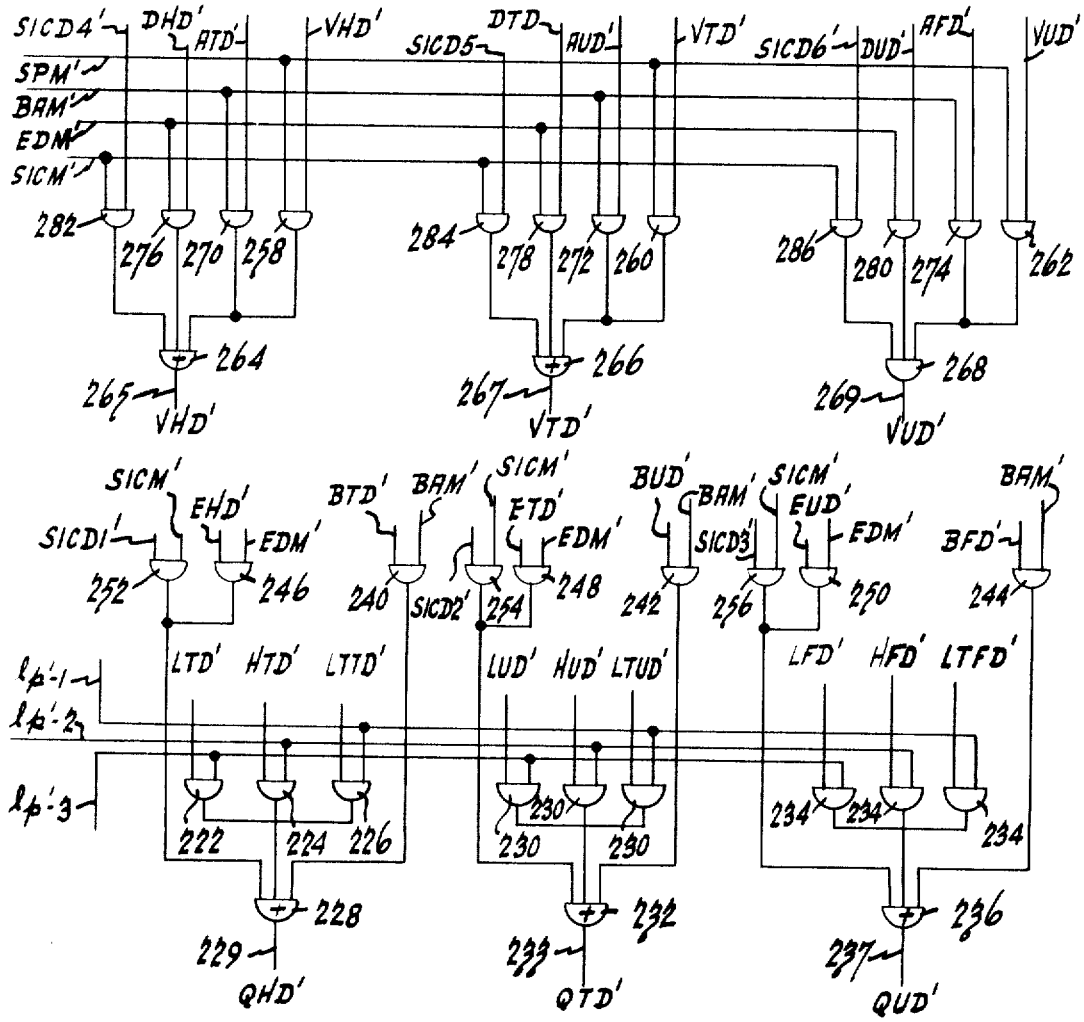
FIG. 7 is a schematic block and logic diagram of transfer gates used in the system of FIG. 1.

The message-type control signals are supplied to the drum-transfer gates 64 which are shown in detail in FIG. 7. A first set of gates 222, 224, 226, respectively, receive the Low, High, and Last bits from the read-write amplifiers of the respective bins 24 on the drum 20, and from those amplifiers associated with the tracks carrying the most significant (or tens) digit signals. These gates are respectively enabled by the 1p-3, -2 and -1 signals so that only one of these gates is enabled if a select-price message SPM is to be transmitted, and their output signals are passed via an OR gate 228 to a line 229 that carriers the QHD' signals.

In a similar fashion, one of the similar sets of gates 230 passes the next most significant (or units) digit signals under control of the same 1p signals to an OR gate 232 and thence to a line 233 carrying the QTD' signals; and another set of gates 234 receives the 1p signals, and one is enabled to pass the least significant (or fractional) digit signals via OR gate 236 to line 237 represented as carrying the QUD' signals.

For the next lower priority message, the Bid and Ask message, represented by the BAM signal, three gates 240, 242, 244 are enabled by BAM to pass respectively the tens, units, and fractional digit signals from the corresponding read-write amplifiers for those tracks of the Bid bin of the drum 20. The signals passed by these gates are also supplied to lines 229, 233, and 237, respectively. In a similar fashion, a set of gates 246, 248, 250 receives the EDM signal to pass the hundreds, tens, and units digit signals from the Earnings bin of the drum 20 via the corresponding OR gates 228, 232, 236, respectively. Finally, an SICM signal enables three gates 252, 254, 256 to pass SIC drum signals from the first, second, and third tracks to the corresponding OR gates.

The gates described thus far are used for loading the Q-section of the message register 46 or 50. An additional set of gates is used for loading the V-sections of those registers. The latter includes three gates 258, 260, 262, each of which receives the SPM' signal together with the Volume digit signals which are respectively the hundreds, tens, and units digit signals from the corresponding drum tracks. The outputs of these gates are supplied to three OR gates 264, 266, 268, respectively, which feed lines 265, 267, 269. In a similar fashion, three gates 270, 272, 274 receive the BAM' signal together with the corresponding ones of the Ask signals; three gates 276, 278, 280 receive the EDM' signal together with the corresponding ones of the Dividend signals; and three gates 282, 284, 286 receive the SICM' signals together with the fourth, fifth, and sixth tracks of the SIC signals (the sixth SIC track may be used to carry any desired special signal or combination thereof, such as an identification of the exchange on which the stock is traded). These gates are all grouped in corresponding fashion and connected through the OR gates 264, 266, 268 to the appropriate lines connected to the V-sections of the message registers.

Figure 8:
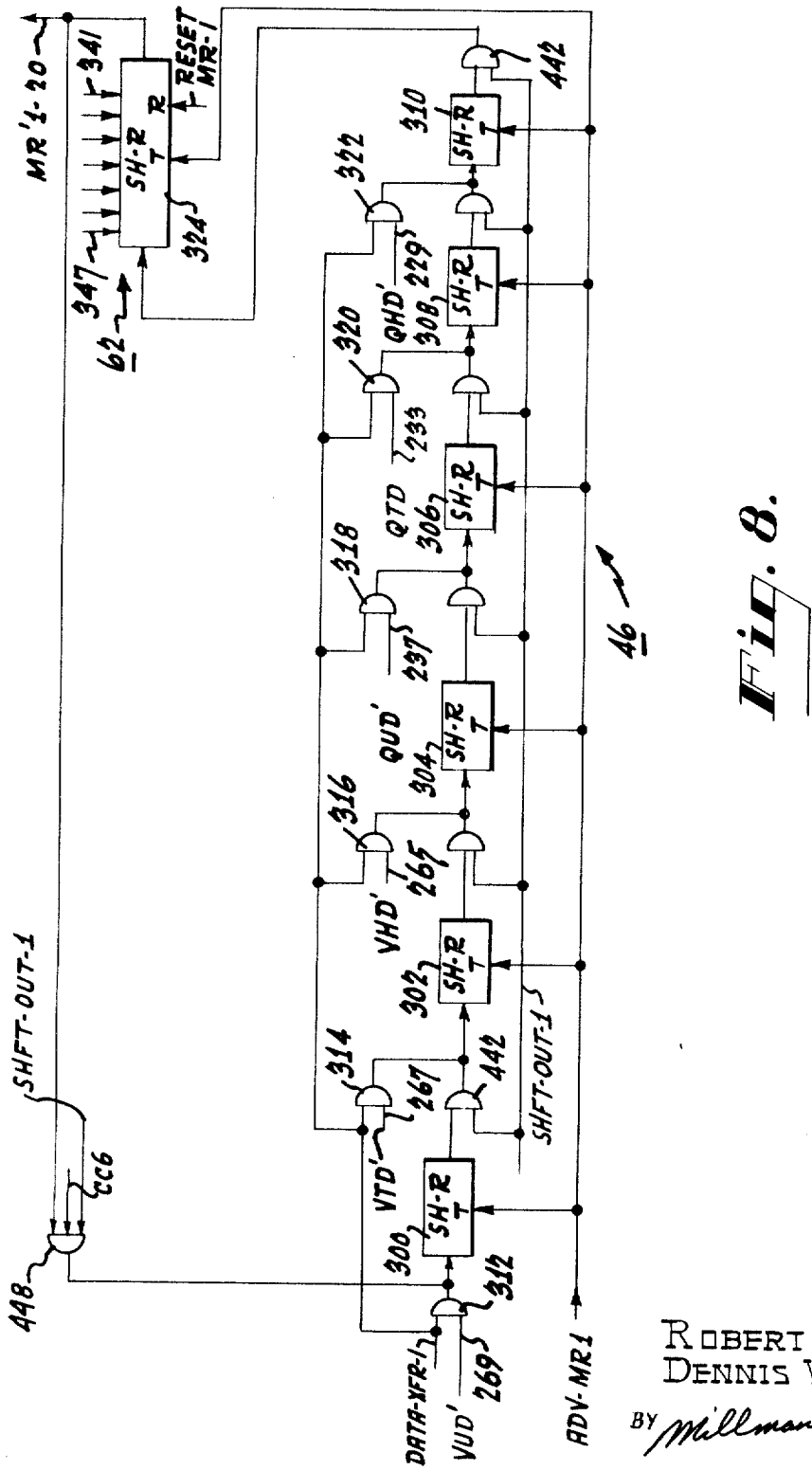
FIG. 8 is a schematic block and logic diagram of portions of message registers used in the system of FIG. 1.

In FIG. 8, the details of the V- and Q-portions of MR-1 are shown. The construction of MR-2 is the same except for the control signals therefor, which will be apparent from the following description. Three 4-stage shift registers 300, 302, 304 form the V-section of MR-1; and three other 4-stage shift registers 306, 308, 310 form the Q-section thereof. Each of these shift registers is shifted by ADV-MR-1 pulses. Three gates 312, 314, and 316 respectively receive the units, tens, and hundreds digit signals from the Volume transfer gate lines 269, 267, and 265, respectively. The outputs of these gates are respectively supplied to the first-stage inputs of the shift registers 300, 302, and 304. Similarly, three gates 318, 320, 322 receive the units, tens, and hundreds digit signals from the Q-transfer gates via lines 237, 233, and 229. The latter gates supply their outputs to the first-stage inputs of shift registers 306, 308, and 310.

Each of the gates 312 to 322 is enabled by the Data-XFR-1 signal supplied at this time by the function generator (FIG. 3) to transfer successive bits of the selected cell into the first stages of the shift registers 300 to 310 under the control of the ADV-MR-1 pulses, which are also generated by the function generator at this time.

There are six different basic messages that may be transmitted: the three different price messages (Last, High, or Low) in the Q-section, each of which carries the Volume in the V-section of the message; the Bid and Ask message which carries the Bid price in the Q-section and the Ask price in the V-section; the Earnings and Dividends message which carries the Earnings in the Q-section and the Dividens in the V-section; and the SIC-change message which carries the SIC code in both sections.

The remaining section 62 of MR-1 is a 7-stage shift register 324 which receives on lines 341-347 the seven bit code that is used combinatorially identify the type of message that is being transmitted. The encoder of FIG. 6 develops this code; it includes seven OR gates 326-338 for combinatorially encoding a 7-bit message-type code from the six different message signals. Thereby, provision is provided for other and different kinds of messages as may be desired. The OR gates 326 to 338 collect different combinations of the message signal lines to establish at their outputs a combinatorial representation of the different message types. These encoder signals are actually developed at the beginning of the comparison search mode of operation since the message code bits are then established in the register 52.

Associated with the seven OR gates 326 to 338 are seven AND gates 340, which respectively receive the outputs therefrom. The seven output lines 341 to 347 of the gates 340 are respectively connected in parallel to inputs of the seven flip-flops making up the 7-stage shift register 324. The AND gates 340 are enabled by an XFR-MR-1 signal, and separate gating is not required at the shift register 324. A reset MR-1 signal is used in order to clear the shift register 324 before transferring the message-type code thereto. For purposes of transferring the information in parallel into the seven flip-flops of shift register 324, the 1-outputs of each of those flip-flops can be driven directly to register the appropriate message code states. A parallel set of gates (not shown) similar to gates 340 respectively receive the outputs of OR gates 326 to 328 and are gated by a signal XFR–MR–2 to transfer the message code into the message-code section of MR–2 when the latter is in the load cycle.

The signals XFR–MR–1 (and MR–2) are generated by suitable logic (not shown). A gate is used to combine the Data–XFR–1 signal with the timing signal G4P3′ which is "stretched" to extend slightly beyond the end of this transfer-cell time. By generating XFR–MR–1 to extend just beyond the end of the cell time, that transfer signal is available after the ADV–MR–1 signal (generated by P′–3) terminates, so that the transfer operation for the message-type code takes place after the transfer of data into the V- and Q-sections of MR–1 is completed. Thus, ADV–MR–1 used for transferring data into the V- and Q-sections is not present to interfere with the parallel code transfer into shift register 324.

The same Data–XFR–1 signal is combined with P–2 pulses to enable a gate and develop the Reset MR–1 signal that resets the message code register 324 just before the new message code is transferred therein. The Data–XFR–2 and Reset MR–2 are generated in a similar fashion except that the corresponding MR–2 signals are used as inputs.

To summarize, the drum-transfer mode is initiated after the comparator locates the proper SIC cell. The following offset information cell of data is then transferred into MR–1 during that cell time of the drum as the information is read serially from the drum. At the end of that cell time, the message-type code is transferred in parallel into its section of MR–1. Thus, MR–1 is then loaded and ready to transmit its message.

The shift control mode follows the data transfer mode and is determined by the state of the shift-control FF–108. When the latter is set, the phone line 66 is busy; and when reset, the phone line is free for a message to be shifted out.

Should SC FF–108 be already set when the data transfer mode is completed, the data already transferred into storage in MR–1 will be maintained therein. The control for this is the DT FF–106 which remains set, and the CMP FF–104 which is reset by the next I–1 pulse.

If we assume that the phone line is free to receive the message from MR–1 immediately after the data transfer operation, the I–1 pulse for the next cell immediately after the transferred cell resets CMP FF–104. At the same time a gate 350 (FIG. 2) is enabled by DT′ and SC (since FF–106 and –108 are respectively set and reset), and the SC Gate signal is generated on line 351. This signal also primes SC FF–108 to be triggered to the set state by the next I–1 pulse, and DT FF–106 to the reset state thereby. Thereby, the control logic is placed in the final or shift-control mode of operation.

At the same time that gate 350 is being enabled, gate 352 is enabled by the same signals to pass G4P3′ and set the drum-search FF–102. Accordingly, the I–1 immediately following, which sets SC FF–108 and resets DT FF–106, establishes the conditions for simultaneously returning the control logic to the drum-search cycle, but this time for MR–2. The actual enabling of the control logic for MR–2 is via RC FF–110 which is triggered to the opposite state by the SC Gate signal; that is, the latter enables gates 354 and 355 (also enabled by the respective FF–110 outputs) to prime the FF–110 inputs to be reversed by the next I–1 pulse. Thereby, the logic conditions are established for loading MR–2 with the next message, and the same cycle of operation is performed for that message register as described above for MR–1. This loading of MR–2 proceeds while the shift control cycle for MR–1 is continuing.

During this transition time that MR–2 is being shifted into the loading condition and the drum search mode therefor is being started, gate 154 in the advance pulse generator (FIG. 3) is inhibited by SC Gate to prevent the generation of ADV–4 which would otherwise cause an erroneous shift in the loaded SIC registers of MR–1 (ADV–3 and –5 are similarly inhibited). As soon as the DT FF–106 is reset, SC Gate terminates, and the drum-search mode for MR–2 can proceed.

To summarize the sequence of operation in the changeover from the data transfer to the shift mode: Gate 352 passes G4P3′ to set DS FF–102 at the end of the data transfer cell. Immediately thereafter, the I–1 pulse starting the next cell triggers RC FF–110 to the opposite state to enable the loading of MR–2, and also triggers SC FF–108 to the set state and DT FF–106 to the reset state. These conditions of the latter flip-flops put MR–1 in command of the phone line for the shift-out mode of operation.

Figure 9:
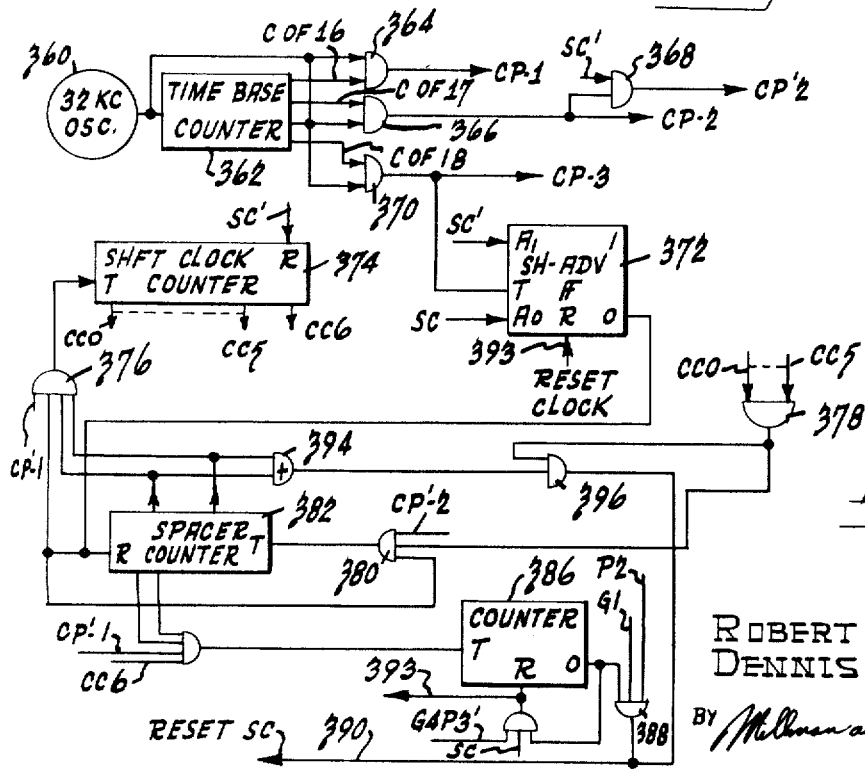
FIG. 9 is a schematic block and logic diagram of the timing control for the shift-out operation in the system of FIG. 1.

The timing control of the shift-out operation is shown in FIG. 9. A 32 kc. oscillator 360 supplies its pulses to a time base counter 362. The latter has five binary stages to divide the frequency to a 1 kc. rate. At a count of 16 a gate 364 is enabled to pass the next oscillator pulse, which is identified as CP–1. A gate 366 is enabled at the count of 17 in counter 362 to pass the next oscillator pulse and generate CP–2. The latter enables a gate 368 with the signal SC′ to generate CP′–2. A gate 370 similarly generates CP–3 upon the count of 18.

The signal CP–3 triggers a shift-advance flip-flop 372 to the set state when the SC FF–108 is in the set state for the shift-out operation. At the same time a shift clock counter 374 has the reset hold signal removed under these conditions. The counter 374 has seven binary stages which enable it to provide two successive counts of 64. The counter 374 is triggered by CP′–1 pulses passing gate 376 when the latter is enabled by the 0-output of set FF–372.

The count of 64 in counter 374 is recognized by gate 378, and the output of the latter enables gate 380 to pass CP′–2 pulses when FF–372 is set. The pulses from gate 380 trigger a 2-stage spacer counter 382. Outputs from each of the latter's stages are used to enable gate 376 only when the counter 382 is in the 0-count state.

In operation, the CP pulses are used to time the shift-out of the message from MR–1 onto the phone line, and the counter 374 is thus effective to count the bits of the message being transmitted. When a count of 64 is registered in counter 374, gate 380 is enabled to trigger spacer counter 382. The latter's outputs then inhibit gate 376 and terminate momentarily the counting of CP–1 in counter 374. Three more CP′–2 pulses are effective to restore spacer counter 382 to the 0-condition, which again enables gate 376 to pass CP′–1 pulses to the counter 374 to repeat the cycle of a count of 64.

As is described hereinafter, during two successive counts of 64, the message is transmitted and retransmitted from MR–1 (or MR–2) onto the phone line. The spacer counter 382 permits the insertion of a 3-bit space between the two message transmissions. The signal CC6 from the seventh stage of counter 374 is an enabling signal (for recirculation in MR–1 and –2, FIGS. 4 and 8) during the first cycle of transmission. Upon completion of the second cycle of transmission, CC6 again becomes an enabling signal, and it is applied to gate 384 together with outputs of counter 382 to enable gate 384 upon a count of 3. Accordingly, CP′–1 is passed therethrough to trigger a single stage binary counter 386 to the set state. Its 0-output is used to enable gate 388 to pass the next G1P2′ timing signal to line 390, which signal is used to reset the SC FF–108 to indicate that the shift-out cycle is completed. This gate 388 synchronizes the end of the shift-out operation with the drum timing signals in the resetting of SC FF–108 so that the mode controls are again synchronized to the drum signals. After SC FF–108 is reset, gate 392 passes the next G4P3′ signal to reset counter 386 and to generate the Reset Clock signal for resetting the shift-advance FF–372.

A hang-up condition may occur in the shift-out controls of FIG. 9 upon the turn-on of the equipment; that is, if either stage of counter 382 is in the 1-state at the same time that any of the first six stages of counter 374 are in the 1-stage, an inconsistency exists which would prevent the passage of pulses through gate 376. The condition of a 1-state in either of the stages of counter 382 is detected by OR gate 394, the output of which is supplied to gate 396 together with an enabling signal from gate 378 if any of the first six stages is in the 1-state. Under those circumstances, the output of gate 396, which is supplied to line 390, resets the SC FF–108, which in turn resets counter 374 to remove the inconsistent condition.

The shift-out operation from MR–1 (or from MR–2, which is the same) is based on the loaded condition thereof as this mode of operation was started; that is, the SIC section 44 of MR–1 (FIGS. 1 and 4) contains the twenty bits of SIC code which is the address to which the updating message relates. The message code section 62 (FIGS. 1 and 8) contains the seven bits of the message code, and the V- and Q-data sections contain the twenty-four bits of data to be updated. The ultimate message to be transmitted contains, in addition to the fifty-one bits thus far described, an initial 10-bit indexing section to identify the beginning of a message, as well as two parity bits at the end thereof to complete a 63-bit message.

Figure 10:
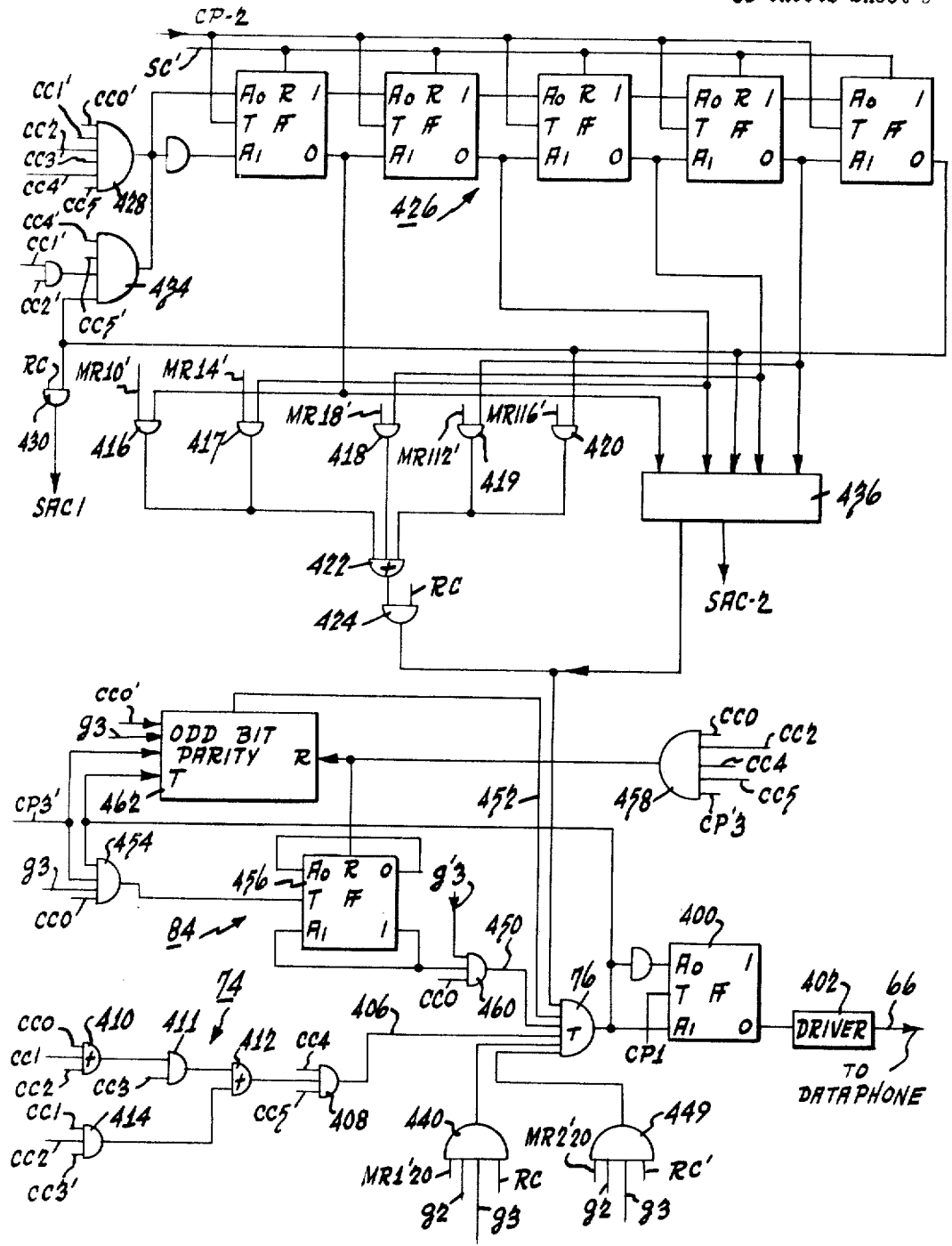
FIG. 10 is a schematic block and logic diagram of the message output section of the system of FIG. 1.

In FIG. 10 the logic for assembling the complete message is shown. The mixer OR gate 76 is shown which receives the message signals in the right order and supplies its output to a message-output flip-flop 400; the latter is triggered by CP–1. The output of FF–400 is supplied to a driver 402 which is a suitable amplifier and level setting circuit for driving the dataphone telephone line 66.

A line 406 feeding mixer 76 connects generator 74 for establishing the index pulses at the beginning of a message. The logic for this generator includes a gate 408 that has its inputs inhibited by CC4 and CC5, that is, by any counts greater than or equal to 16 in the shift clock generator 374 (FIG. 9). For all counts less than 7, the OR gate 410 and gate 411 combine to establish, via OR gate 412, an enabling signal into gate 408 which is effective as a 1-bit to the mixer 76. For counts of 8 or 9, gate 414 supplies an enabling signal via OR gate 412 to gate 408. Thus, for the first nine CP–1 pulses that are counted (corresponding to the first nine bits of the message), 1-bits are supplied via line 406 to the mixer 76 and thence out to the phone line. On the tenth bit, all of the inputs to mixer 76 are 0-bits so that the tenth message bit is a 0-bit.

The SIC commutator 78 includes five gates 416 to 420 which receive as their inputs the MR′–10, –14, –18, –112, and –116 from the five SIC shift registers 134 to 142 (FIG. 4), respectively. The outputs of gates 416 to 420 are connected together through an OR gate 422 and a gate 424 (enabled by RC) to the mixer 76. The gating signals to the gates 416 to 420 come from the five 0-outputs of a 5-stage shift register commutator 426. This shift register has its stages reset by a Reset-SAC signal and triggered by the CP–2 pulses. On the CP count of 11, a gate 428 primes the first stage of commutator 426 to the 1-state, to which it is triggered by the next CP–2; the 0-output of this stage enables gate 416 to send out the first bit from shift register 134 (FIG. 4) to the mixer 76 and then to the phone line. On the next count, CP–2 shifts the 1-bit to the second stage of commutator 426. Gate 417 is then enabled to send out the first bit from shift register 136 to the phone line, and so on, with the first bit of registers 138, 140, and 142 being sent out on CP counts of 13, 14, and 15.

At the count of 15, a gate 430 is enabled by the fifth-stage commutator signal together with the RC signal to develop a SAC–1 signal. The latter is used in the advance pulse generator (FIG. 3) to enable gate 432 together with the RC and CP′–1 signals and generate a single advance pulse ADV–4 which steps all of the SIC registers 134 to 142. At this time of a first message transmission, the recirculation gate 150 for register 134 and for the others is enabled so that the first bit of each of these registers is recirculated; the second SIC bits are then moved up to the outputs thereof and supplied to the inputs of gates 416 to 420. Also at this time, the enabling signal at the output of the last commutator stage is supplied as an input to gate 434 (which is enabled) and thence to the inputs of the first commutator stage. Accordingly, on the next CP–2 corresponding to count 16, the first gate 416 is again enabled to send out the second SIC bit of shift register 134. This cycling continues again through the CP count of 20 with the second bits being sent out from each of the shift registers 134 to 142. On the count of 20, the next ADV–4 is generated by SAC–1 to recirculate the second bits of the shift registers 134 to 142 and set up the third bits thereof at the outputs of those shift registers. The commutation operation continues with each cycle of five counts causing the read-out of a bit from each of the registers 134 to 142 out onto the phone line. Thus, on counts of 20, 25 and 30, an ADV–4 pulse is generated to insure the proper recirculation in the shift registers 134 to 142, and by the count of 30 the complete twenty bits of the SIC code have been established at the mixer 76 and out on the phone line.

This method of sending out the SIC signals from the five shift registers 134 to 142 maintains the binary code of each of the four SIC characters as they are set up successively, so as to insure that a continuous pattern of nine or more binary 1's does not occur within the SIC code, which random condition might occur were the shift registers to be emptied successively one after the other through the mixer 76 without regard to the coded characters.

Thus, upon the count of 30, the last SIC bit is established in the mixer 76 for transmission on the phone line, and these SIC bits are all restored to their initial positions in the shift registers 134 to 142. A similar set of gates 436 is used for sending out the SIC signals from the section 48 of MR–2. The operation and construction thereof will be apparent from the foregoing description.

Upon the count of 31, a gate 440 is enabled by the g–2 signal (which provides an enabling signal in the counts of 31 to 63, and is joined by the g–3 signal which provides an inhibiting signal on the counts of 62 and 63). This gate 440 receives as its input the MR′–120 signal at the 0-output of the last stage of shift register 324 (FIG. 8). This shift register 324 together with the shift registers 300 to 310 are all connected in a string as a single shift register via the gates 442. The latter connect the 0-output of the last stage of one to the inputs of the first stage of the next, and so on. These gates are enabled by the SHFT–Out–1 signal which is generated at this time in the advance pulse generator (FIG. 3) via the gate 444. The latter is enabled over the CP count of 32 to 62 in the shift clock counter 374 (FIG. 9) by a proper combination of the latter's outputs. The SHFT–Out–1 signal enables gate 446 to pass successive CP′–2 pulses to generate ADV–MR–1 over the counts of 32 to 62. Thereby, the shift registers 300 to 310 and 324 are stepped as the message code section and data sections of the message are shifted out onto the phone line via gate 440. Also during this shift-out of the message code and data code signals during the first message transmission, a gate 448 (FIG. 8) connects the mesage code and data sections of MR–1 as a recirculation shift register by connecting the terminal MR′–120 back to the input of the first stage of shift register 300. Gate 449 shifts out the data from MR–2 in the manner described above for gate 440.

Thus, during the counts of 31 to 61 the message code and data portions of the message are sent out through the mixer 76 onto the phone line, and these sections of the message are reestablished in their respective portions of MR-1 by the count of 62.

At the counts of 62 and 63 parity bits are supplied to lines 450 and 452 respectively by an even-numbered-bit parity generator and an odd-numbered-bit parity generator in order to maintain odd parity for the two groups of bits. The output of mixer 76 is recirculated to a gate 454 in the even-numbered-bit generator which is enabled by CC0 on the even counts and gated by CP'-3 (except during the counts of 62 and 63 as determined by g-3). The output of gate 454 triggers a single stage counter 456 which is reset upon the count of 10 by a CP'-3 pulse through a gate 458. FF-456 is successively triggered by the 1-bits from mixer 76 occurring in the even-count positions of the message from message count of 11 through 61 to establish the parity thereof. The 1-output of counter 456 completes the odd parity of the even-numbered bits and is passed by gate 460 to the mixer 76 at the count of 62 as determined by the signal CC0 and g'-3 supplied to that gate. An odd-numbered-bit parity generator 462 is constructed and operates in a similar fashion to supply the odd-numbered-bit parity signal upon a count of 63 to line 452 into the mixer 76, except that generator 462 counts the odd-numbered bits during the message count from counts 11 to counts 61.

With the insertion of the parity bits, the full message is assembled and transmitted over the phone line. After the first such transmission of the message, the spacer counter 382 (FIG. 9) insures a space of three 0-bits thereafter, and then the clock pulses are again counted in counter 374 to initiate the second transmission of the message. This second transmission is performed without recirculation in the message register (due to CC6 now being a gate-disabling signal). Upon the completion of the second transmission, the shift-out control (FIG. 9) restores control to the mode controls (FIG. 2) by resetting the SC FF-108. The phone line is then free and shift-out can start for the other message register in a similar fashion whenever it is loaded.

Figure 11:
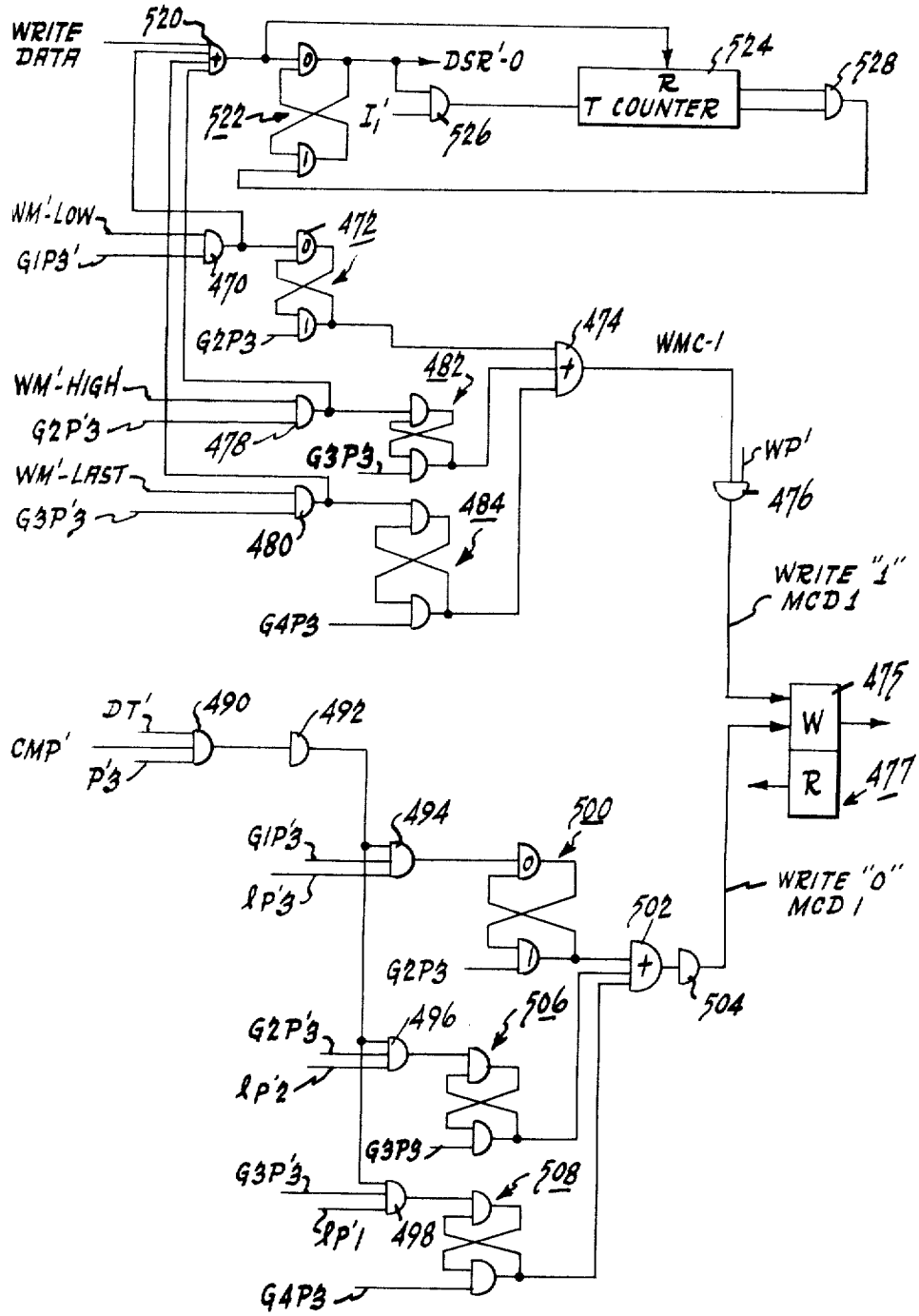
FIG. 11 is a schematic block and logic diagram of the writing and erasing of marker signals in the drum in the system of FIG. 1.

The logic for writing and erasing the marker code signals on the corresponding drum channels is illustrated in FIG. 11. Whenever updated information is being written in one of the master drum channels, a corresponding gate-enabling signal is available for this writing operation that is also used for writing the corresponding marker code bit in the marker code drum channels. Thus, when information is being written into the Low bin, a WM'-Low signal is available that enables a gate 470 to pass a G1P3' pulse to reset a flip-flop 472 that is set by the succeeding G2P3 pulse. The 1-output of FF-472 is passed by OR gate 474 to enable a gate 476 to pass the next write pulse (WP') which develops a Write-1 signal that is applied to the write-section 475 of the read-write amplifier 477 for the marker-code-drum-1 channel (FIG. 12). Thus, during a Low bin updating operation, the flip-flop 472 develops a pulse that lasts for an interval of a bit during G-2 time so that a 1-bit is written into the corresponding location of the marker code drum section.

In a similar fashion a WM'-High signal is developed during writing in the High bin of the drum, which signal together with G2P3' enables a gate 478. A WM'-Last signal enables a gate 480 together with G3P3', and the gates 478 and 480 reset corresponding flip-flops (which are set on the corresponding next bit signal) to develop the WMC-1 signal via OR gate 474 and to write a 1-bit in the first marker code drum channel in the manner described above. Due to the relative time occurrence of these bits, the Low, High, and Last bits are written in the second, third, and fourth bits of the cell as shown in FIG. 12.

A similar flip-flop (not shown) is provided which is reset in a similar fashion by the writing in either of the Bid or Ask bins and is used for developing a pulse for writing in the fourth bit of the second marker code channel. In a similar fashion, additional flip-flops are provided for developing pulses to be written in the third and fourth bits of the third marker code channel when information is being written in the SIC bin and either in the Earnings or Dividends bins, respectively. These flip-flops are used to develop the marker code pulses at the appropriate time in the third marker code channel.

For purposes of erasing from the marker code channels, a control signal is developed during the data-transfer mode operation by means of a gate 490 which is enabled by the DT' and CMP' signals to pass a P-3' signal via an inverter 492 to a series of gates 494, 496, and 498. The gate 494 receives the 1p'-3 signal (which represents a low-price message being loaded in the message register) together with the G1P3' signal. The output of gate 494 resets a flip-flop 500 to develop a pulse at the 1-output thereof, which is passed by OR gate 502 and an inverter 504 and applied to the write section 475 of the read-write amplifier 477 for the first marker code channel on the drum for writing a 0-bit in the first bit section of the cell corresponding to the G-2 time interval. The FF-500 is set by G2P3 terminating that write-0 signal. In a smaller fashion a flip-flop 506 is operated by the 1p'-2 signal (representing a high-price message) together with G2P3'; and FF-508 is operated by the presence of the 1p'-1 (representing a last-price message) together with G3P3'. An additional flip-flop and gate are provided (not shown) for "erasing" the marker code bit, i.e. for a write-0 on the second marker code channel where a Bid and Ask message is being loaded into the message register under the control of a BAM signal. Additional flip-flops are used for developing a write-0 signal for the third channel when SIC or Earnings and Dividends messages, respectively, are being loaded by the SICM, and the EDM signals in a manner similar to that described above.

Thus, any time new information is being written onto the master drum, a corresponding 1-bit is written into the appropriate location of the marker code bin of the drum. When an updating message has been established and is being loaded into the message register in accordance with any of the marker code bits, the corresponding bit in the marker code drum channels is erased (i.e. replaced by a 0-bit). This operation of erasing the marker code bit from the drum completes the data-transfer mode of operation during the assembly of any message.

Whenever a new drum search cycle is started, the shifting of new message code bits into the message code register 52 (FIG. 5) is inhibited for eight cell times. A search-delay flip-flop 510 is held reset by the DS' signal at the R-input thereof whenever the control is not in the drum-search mode. Three other flip-flops 512, 514, and 516 are cascaded in an 8-bit binary counter, and the first stage thereof is triggered by I-1 when a gate 518 is enabled by the DS' signal and the 1-output of reset FF-510. After a count of 8 in the three flip-flops 512, 514, and 516, FF-510 is set by the last pulse therein to develop an enabling signal SED' that enables the input gates 166, 170, 174 of the register 52 (FIG. 5) to read from the message code drum channels into the register 52. During this count of 8 cells after the start of the new drum-search mode, the SED' signal closes the gates 166, 170, 174 and prevents the entrance of the message code markers. This is done because a marker write-0 had just taken place at the end of the preceding drum-transfer mode, and the write current in the read-write amplifier tends to "swamp" the read section thereof. Thus, this delay permits the read amplifier to recover. The counter 512–516 remains disabled with FF-510 in the set state until the next drum-search mode starts and resets FF-510 in the manner described. The SED signal is used as an inhibit for gate 182 (FIG. 2) to prevent the detection of spurious marker code signals in the register 52 during the delay period. Thereby, premature resetting of DS FF-102 by such detection is prevented.

Any time that the write amplifiers are writing new information onto the drum, the reading of information from associated amplifiers is inhibited for a short period of time immediately following since the write amplifiers will swamp the read amplifiers under those circumstances. As shown in FIG. 11 an OR gate 520 receives the writemark signals WM' as passed by gates 470, 478, 480 any time a price is being written into the associated bins of the drum as well as a Write-Data signal when the Volume is being written into the corresponding drum channel. The output of OR gate 520 sets a flip-flop 522 and also resets a 4-stage binary counter 524. The 0-output of FF–522 is an inhibit DSR'–0 signal which enables gate 526 to pass successive I'–1 signals to trigger counter 524. When the latter reaches a count of 12, gate 528 is enabled to reset FF–522 and terminate the DSR'–0 inhibit signal. During the period that FF–522 is set, no data can be transferred concerning price or volume; this is an effective inhibit in the message-type encoder (FIG. 6) and indirectly in the drum-transfer gates 64 (FIG. 7) since the latter's control signals are generated in the former, and also at the inputs of the message code register 52 (FIG. 5). In a similar fashion, a DSR'–1 signal is developed from a similar flip-flop (not shown) whenever the drum channels for Bid, Ask, Earnings, Dividends, or SIC are being written into. Thus, no data relating to the latter categories can be transferred during the setting of that flip-flop.

The DSR'–0 signal is also used in gate 530 together with the CMP' signal (which is an enabling signal after the comparison operation has been performed and the change into the data transfer mode is indicated) as well as the G1P2 signal. The output of gate 530 is used to reset DT FF–106 by way of the 0-output thereof. Such reset is necessary when the generation of message type signals into the OR gate 198 and gate 196 are used to set DT FF–106 and start the data transfer operation. However, due to the generation of DSR'–0, whenever writing on the drum takes place, the data-transfer mode is inhibited; this effectively terminates that loading cycle of the drum (since the desired cells have passed the read-write heads).

A counter 532 (FIG. 2) is held reset by the DS signal when operating in the drum-search mode, and is permitted to count as soon as the comparison mode is started. It counts quadrant timing marks Q (FIG. 13) equally spaced at quadrant points around the drum. When counter 532 reaches a count of 5 without a comparison being located, gate 534 detects that count and sets the drum search flip-flop to terminate the comparison mode and start a new drum search mode. Thereby, if for some reason, a comparison cannot be located, the logic is not hung up on an indefinite comparison mode, and a new marker code is looked for in the new drum search cycle.

It has been found in practice that the above described master output system operates sufficiently fast to maintain the slaves undated as required. However, in view of the 7-bit message type combinatorial code, the logic of the system may be modified if desired, in order to transmit messages where any two or three of the High, Low, and Last prices are the same. For this purpose, it may be assumed any time this combination of markers existed, that the prices were in fact the same, such as the opening price of a stock being bought at High, Low, and Last, or a new High also being the Last price. If such a condition occurs, the marker code bits may be used to generate a marker type code in the encoder of FIG. 6 (by suitable modification thereof) corresponding to that combination of marker bits. The Last price may be assembled in the message as usual (all three price marker bits would be erased when the message was assembled and being transmitted), and the slave station would recognize the combinatorial message type code to update the Last price as well as the High and/or Low price as called for by the message.

The slave stations 67 and 68 are generally the same, and each includes a cyclic memory such as a magnetic drum which is the same as the master memory or drum. As the messages come into the slave station, their handling is synchronized to the drum thereof, and they are assembled in a register. The latter, after assembling the transmitted message and checking for parity, operates to locate on the drum the SIC code of the message and to transfer the data portion of the message into those of the associated bins called for by the message type code. If the parity of the assembled message checks out, the retransmission of the message is ignored; otherwise, it is utilized. The slave stations also have associated therewith a plurality of broker stations, each of which has one or more console units for requesting information about any stock. The console units have manually operated switching devices for establishing code signals for a desired SIC and bin category. These request signals from all of the console units are sent to the slave memory system where a drum read-out system locates the required information and transmits it back to the console units. The latter include display devices for visually presenting the transmitted information. A suitable slave station of the type utilized with this invention is described in the aforementioned copending patent application, Ser. No. 108,120; the system for writing on the master drum may be of the same type as that described in the copending application for writing on the slave drums.

Thus, with this system a large number of individual brokers can gain access substantially simultaneously to each slave store for any desired information. The slaves can be located all over the country for servicing individuals within a limited area with information that is fully updated from a central source immediately after the latter receives the information. Thus, effectively the individual brokers have access to the updating facilities of the central source (which may include one or more complex digital computers) without having to communicate directly therewith. Consequently, a considerable saving in communications facilities is made possible as well as a practical arrangement for a large number of brokers to have simultaneous access to the information without "queing up."

Thus, this invention provides an improved system for storing and supplying updated information about stock transactions and quotations. An automatic data message assembly and transmission system is provided which is constantly checking a master cyclic memory for any changes in stored information. Whenever such changes are detected, an appropriate message is automatically assembled and transmitted to a plurality of slave stations for updating of the latter's memories.

What is claimed is:

1. In a stock information system comprising a plurality of independent memory systems; each of said memory systems having a memory for storing coded signals representing stock transaction information for different stocks identified by different signal code combinations, a plurality of operator consoles each having means for selectively requesting stock information from said memory by establishing said stock code combinations and for manifesting the requested stock information obtained from said memory, means for coupling said consoles to said memory to obtain the requested information, and means for entering the stock information in said memory in accordance with coded signal messages specifying the stock code combinations and the stock information; and common means for supplying said messages to said memory systems, said common message supplying means including a cyclic master memory for storing stock information in accordance with said independent memory systems, said master memory having separate storage sections associated with each of said stock code combinations for storing the associated stock information signals and certain marker signals, means for writing new stock information signals in said master memory and for writing a marker signal in the associated storage section, and means responsive to said stored marker signals for assembling and transmitting said messages and for thereafter erasing the associated marker signals.

2. In a stock information system as recited in claim 1 wherein said master memory has separate storage sections for each of a plurality of categories of stock information, a different signal marker is stored for each of said categories, and said assembling means obtains the category of information associated with the detected marker.

3. In an information handling system comprising a plurality of independent memory systems; each of said memory systems having a memory for storing coded signals represnting different categories of information for different groups identified by different signal code combinations, a plurality of operator consoles each having means for selectively requesting stock information from said memory by establishing said group code combinations and signals identifying said categories and for manifesting the requested information obtained from said memory, means for coupling said consoles to said memory to obtain the requested information, and means for entering the information in said memory in accordance with coded signal messages specifying the group code combinations, the category and the information; and common means for supplying said messages to said memory systems, said common message supplying means including a cyclic master memory for storing said information in accordance with said independent memory systems, said master memory having separate storage sections associated with each of said group code combinations for storing the associated information signals in accordance with said categories and certain marker signals, means for writing new information signals in said master memory and for writing different marker signals in the associated storage section corresponding to said categories, and means responsive to said stored marker signals for assembling and transmitting said messages and for thereafter erasing the associated marker signals.

4. A stock information system comprising a cyclic memory for storing coded signals representing stock transaction information for different stocks identified by different signal code combinations, said memory having a plurality of sections associated with each of said stock combinations for respectively storing a plurality of categories of stock information and a plurality of marker signals, means for writing new information signals and associated marker signals in said storage sections, and means having different operating modes for assembling messages containing said new information, said message assembling means including means effective during a memory search mode for detecting and registering said marker signals and for registering the stock combination associated with the detected marker signals, means effective during a comparison and transfer mode for locating and registering the category of stock information associated with the detected marker signals and the registered stock combination, and means effective during a transmitting mode for transmitting a message including the registered stock combination, a message code corresponding to the registered marker signal, and said registered stock information.

5. A stock information system as recited in claim 4 wherein said message assembling means includes a plurality of register means for registering said stock combinations, stock category information and message codes, and means for operating said register means with one register means alternately in said transmitting mode and another register means concurrently in said memory search, comparison and transfer modes.

6. An information handling system comprising a cyclic memory for storing coded signals representing transaction information for different groups identified by different signal code combinations, said memory having a plurality of sections associated with each of said group combinations for respectively storing a plurality of categories of information and a plurality of marker signals, means for writing new information signals and associated marker signals in said storage sections, and means having different operating modes for assembling messages containing said new information, said message assembling means including means effective during a memory search mode for detecting and registering said marker signals and for registering the group combination associated with the detected marker signals, means effective during a comparison and transfer mode for locating and reigstering the category of information associated with the detected marker signals and the registered group combination, means effective during a transmitting mode for transmitting a message including the registered group combination, a message code corresponding to the registered marker signal, and said registered information, and means effective during said comparison and transfer mode for erasing form said memory the registered marker signals.

7. In an information system for stocks and the like, apparatus for producing updating messages from a cyclic memory which comprises
  (a) a cyclic memory having cyclic sections for storing a plurality of categories of stock information and corresponding marker signals,
  (b) means for writing new information in said category sections for respective stocks,
  (c) means for writing marker signals in said marker section for indicating said writing of new information and the categories thereof,
  (d) message assembling means responsive to said marker signals for assembling messages containing said new information and message codes indicating the respective categories of the information,
  (e) means for erasing the marker signals corresponding to information assembled in said messages,
  (f) and means for transmitting said messages.

8. In an information system for stocks and the like, apparatus for producing updating messages from a cyclic memory which comprises
  (a) a cyclic memory having a cyclic stock identification section for coded multi-character identifications of stocks, a plurality of separate cyclic sections for a plurality of different categories of stock information and a separate marker cyclic section, the portions of said category and marker sections for a respective stock occurring simultaneously,
  (b) means for writing new information in said category sections for respective stocks,
  (c) means for writing marker signals in said marker section for indicating said writing of new information and the categories thereof,
  (d) message assembling means responsive to said marker signals for assembling messages containing said new information, corresponding coded multi-character stock identifications and message codes indicating the respective categories of the information,
  (e) means for erasing the marker signals corresponding to information assembled in said messages,
  (f) and means for transmitting said messages.

9. A system in accordance with claim 8 in which the portions of said category and marker sections for a given stock occur in said cyclic memory after the occurrence of the corresponding multi-character stock identification, and including means for reading out said multi-character stock identifications in succession, means responsive to a marker signal for storing the corresponding stock identification in said message assembly means, and means for determining coincidence of the stored stock identification with the corresponding memory stock identification in a subsequent memory cycle, said message assembling means including register means for receiving stock category information and means responsive to said coincidence for supplying said new information from the cyclic memory to said register means.

10. A system in accordance with claim 8 including means for utilizing said marker signals in the cyclic memory to produce corresponding message codes for said messages.

11. A system in accordance with claim 9 in which said message assembling means includes a plurality of said register means and means for operating the register means alternately for assembling respective messages, and including a delay shift register for receiving said multi-character stock identifications from the memory in succession, and means for supplying the output of said delay shift register to said plurality of register means alternately, the delay in said delay shift register being substantially equal to the delay of the category and marker sections of the memory with respect to the corresponding multi-character stock identification.

12. A system in accordance with claim 8 including means for establishing a predetermined priority in the assembling of messages corresponding to a plurality of different categories of new information of a given stock.

13. A system in accordance with claim 8 including means for inhibiting the response of said message assembling means to said marker signals for a predetermined interval after the erasing of a marker signal.

14. A system in accordance with claim 8 including means for inhibiting the response of said message assembling means to said marker signal for a predetermined interval after the writing of new information in said memory.

15. A system in accordance with claim 8 in which the marker signal corresponding to information assembled in a message is erased and the respective information left stored in said cyclic memory.

References Cited by the Examiner
UNITED STATES PATENTS 3,133,268   5/1964   Avakian et al. ____ 340—172.5

ROBERT C. BAILEY, *Primary Examiner.*

M. LISS, *Assistant Examiner.*